United States Patent [19]

Kaise

[11] Patent Number: 4,588,276
[45] Date of Patent: May 13, 1986

[54] IRIS DIAPHRAGM DEVICE FOR A CAMERA
[75] Inventor: Hitoshi Kaise, Nirasaki, Japan
[73] Assignee: Nippon Seimitsu Kogyo Kabushiki Kaisha, Kofu, Japan
[21] Appl. No.: 738,758
[22] Filed: May 29, 1985
[51] Int. Cl.⁴ .............................................. G03B 9/06
[52] U.S. Cl. ................................... 354/271.1; 354/274
[58] Field of Search .............................. 354/271.1, 274
[56] References Cited
U.S. PATENT DOCUMENTS
4,460,253 7/1984 Kawai et al. ................ 354/271.1 X Primary Examiner—Michael L. Gellner
Attorney, Agent, or Firm—Oblon, Fisher, Spivak, McClelland & Maier

[57] ABSTRACT

An iris diaphragm device for use in an automatic exposure cameras of various types comprises iris diaphragm leaves which are simultaneously opened or closed by rotational motion of a leaf operating disc and a drive element having a movable magnetic ring of a noncircular shape composed of near segments with pivot pins and remote segments and adapted to rotate the leaf operating disc. The mechanism for pivotally supporting the movable magnetic ring and transmitting the swinging motion of the movable magnetic ring to the leaf operating disc is mounted in the space left outside the near segments of the movable magnetic ring without the smallest strain, thereby preventing the lens barrel of the camera from being increased in size or protruding in part.

10 Claims, 8 Drawing Figures

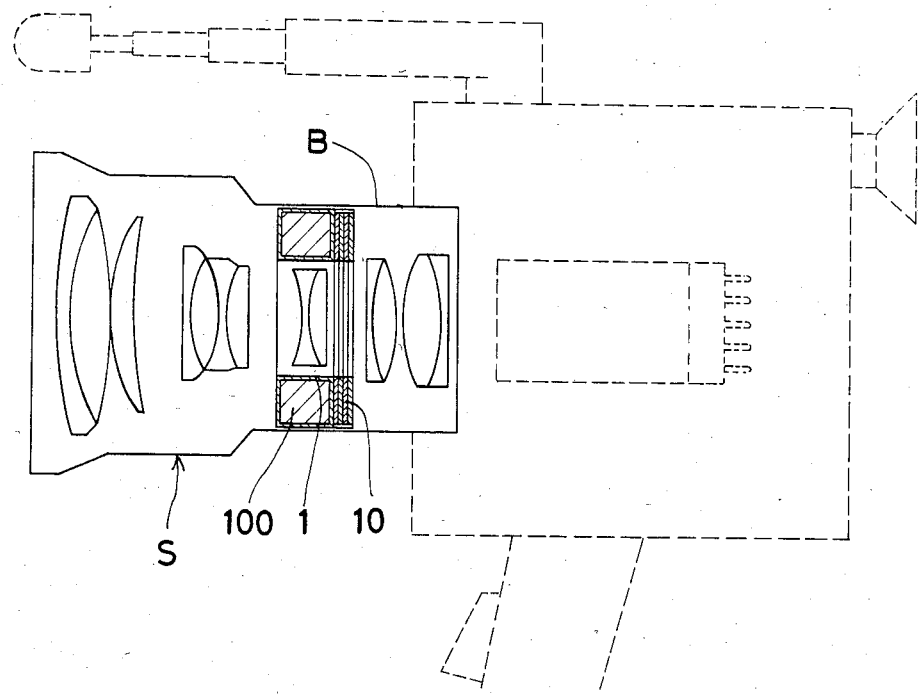
FIG_1
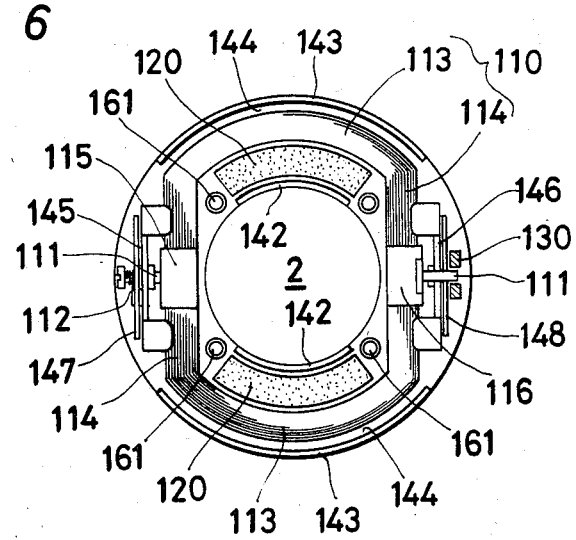
FIG_6

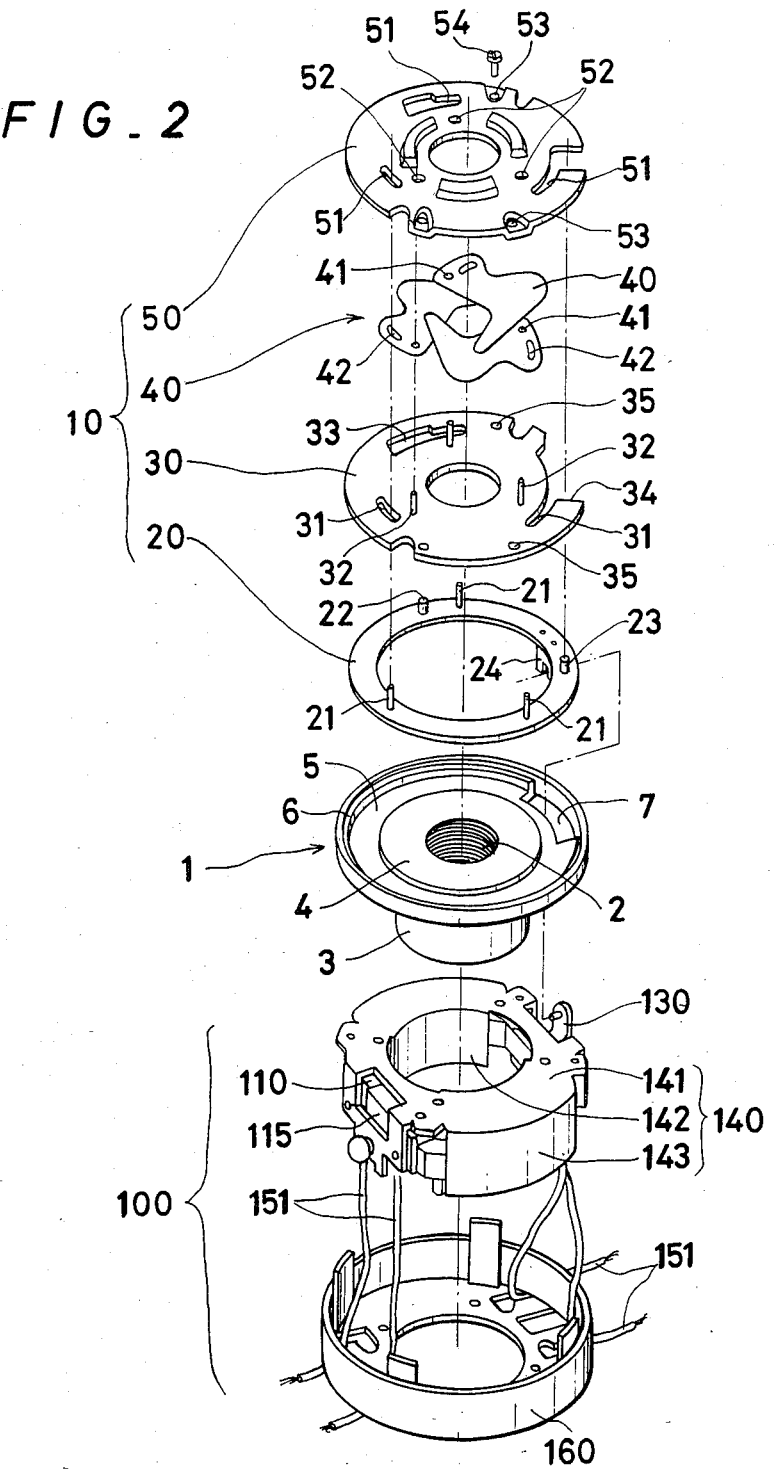
FIG_2

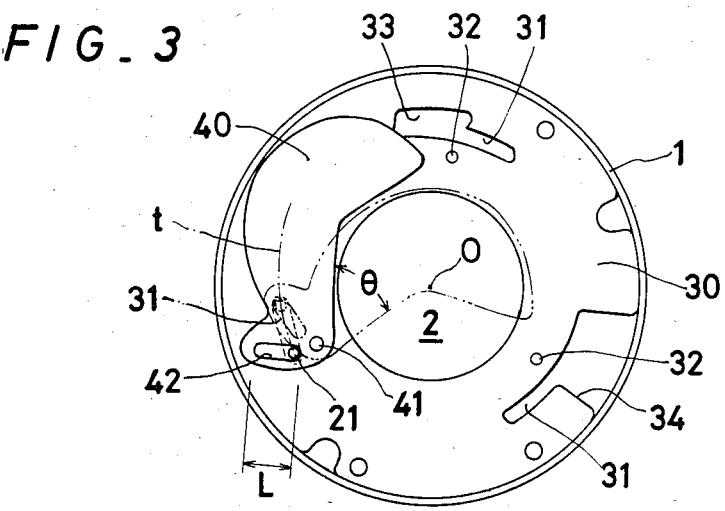
FIG_3
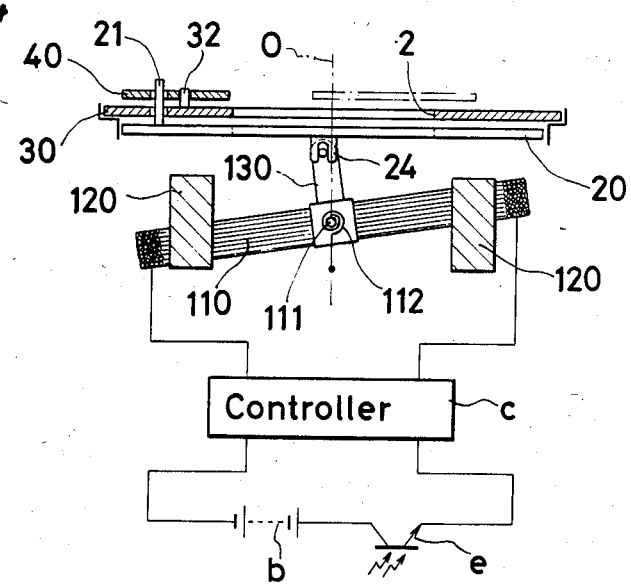
FIG_4

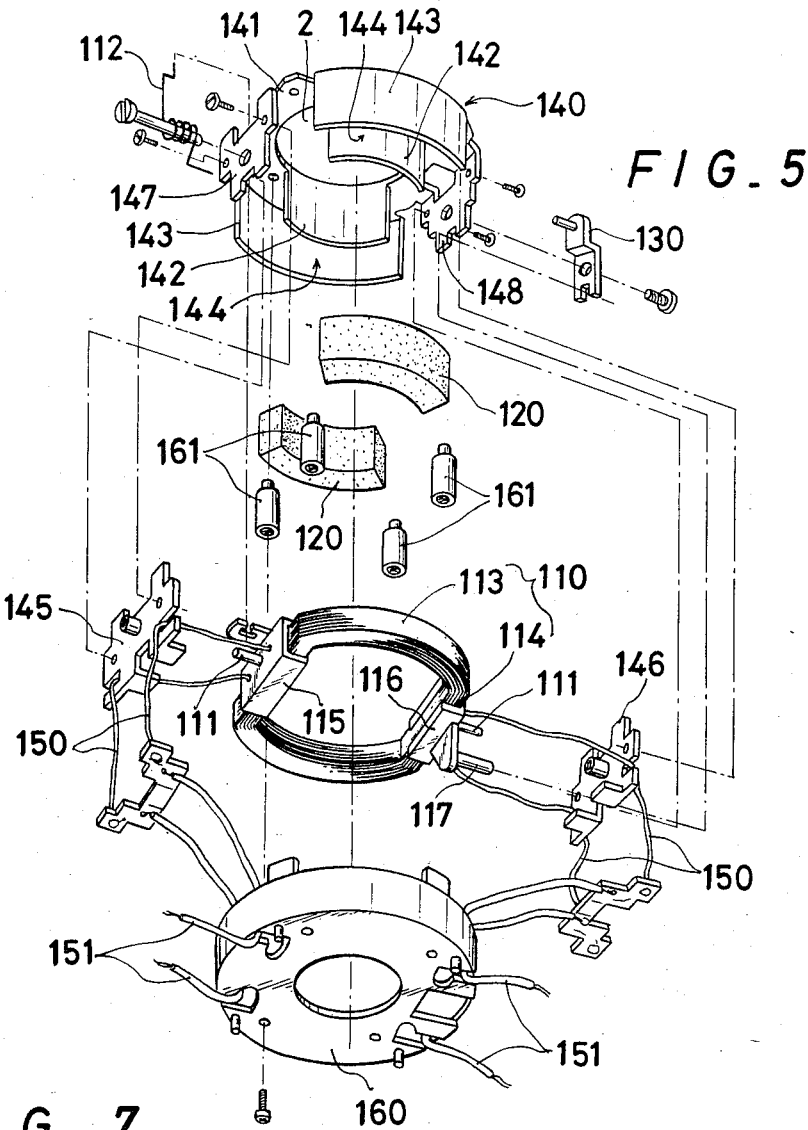
FIG_5
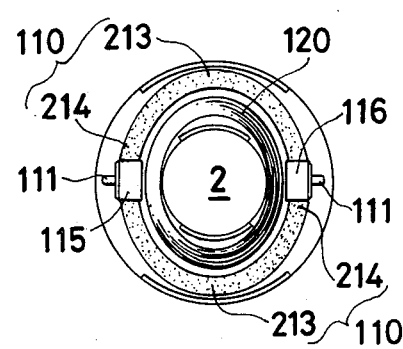
FIG_7
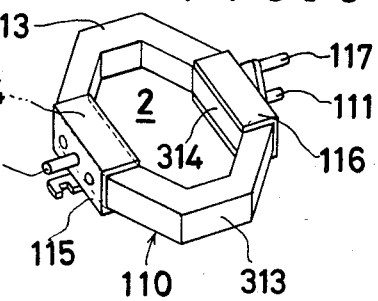
FIG_8

IRIS DIAPHRAGM DEVICE FOR A CAMERA

BACKGROUND OF THE INVENTION

1. Field of the Invention

This invention relates to an iris diaphragm device for use in a camera and, more particularly, to an iris diaphragm device which can be compactly mounted within cameras of various types such as a still picture, a cinecamera and a video camera and applied to an automatic exposure control system for automatically adjusting the size of an iris aperture in the optical system to determine appropriate exposure in accordance with the quantity of light of a subject.

2. Description of the Prior Art

An iris diaphragm device incorporated in optical systems in cameras of various types such as a still picture camera, a cinecamera and a video camera is generally composed of an iris diaphragm element having a plurality of iris diaphragm leaves which can be swung about their pivots and a drive means for opening or closing the iris diaphragm leaves to determine appropriate exposure in accordance with the brightness of a subject detected by means of a photoelectric device such as a charge coupled device (CCD). Such iris diaphragm leaves in the diaphragm device for a camera are rotatably supported by pivots so that the diaphragm leaves can rotate around the pivots to be opened or closed relative to the optical axis of the optical system, thereby to form an aperture through which the light rays pass. The diaphragm device of the construction discribed above is generally held in position by a ring-shaped or cylindrical base member and fixedly incorporated inside a camera body or a lens barrel. On the other hand, the drive element for causing the aforementioned diaphragm leaves to be opened or closed is usually composed, similarly to an electric motor, of an electromagnetic coil and one or more magnets for applying a magnetic field to the eleclromagnetic coil. This drive element has been disposed outside the aforementioned base member in such a state that the motive power is transmitted to the aforementioned diaphragm device through the medium of a leaf operating means so as to open or close the diaphragm leaves. Therefore, the drive to be incorporated into the optical system inevitably protrudes in the shape of a ring from the outer surface of the lens barrel. The protrusion of the drive element from the lens barrel is both unsightly and unhandy.

Recently, a need has been felt for a small and light parts including the diaphragm device in a video camera or the like. Specifically, in order to provide a camera of good appearance from the standpoint of design, the outer diameter of the diaphragm device are desired to be close to that of the lens barrel in the camera.

Mechanisms intended to reduce the outer diameter of the diaphragm device by mounting the drive element for effecting opening and closing of the iris diaphragm leaves within a base member for fixing the iris diaphragm leaves have been proposed in Japanese Patent Application Public Disclosure Nos. SHO 54(1979)-99424 and SHO 48(1973)-15524, for example.

The former mechanism consists of iris diaphragm leaves distributed at equi-distance about an aperture and magnetic rotary members of small size as many as the diaphragm leaves, each disposed outside the respective diaphragm leaves, so as to cause opening or closing motion of the diaphragm leaves by angularly rotating the magnetic rotary members in order. The megnetic rotary member in this mechanism has a structure similar to an electric motor, that is to say, it is constructed merely by compactly containing an electromagnetic coil and magnet rotors into a small-sized cylindrical yoke. Because of the construction described above, this diaphragm mechanism is complicated in structure and exhibits inferior driving power for operating the diaphragm leaves. There is a possibility that this mechanism will be incapable of providing required opening or closing motion of the diaphragm leaves.

The latter diaphragm mechanism comprises a plurality of magnets circularly disposed in a row, a circular guide rail arranged in parallel to and above the row of the magnets, and moving coil members mounted slidably on circular guide rail. The coil members are linearly moved along the guide rail by applying an electric current to the moving coil members in accordance with the brightness of a subject, thereby to open or close the diaphragm leaves.

Neither of the diaphragm mechanisms described above assures stability of the synchronous motion of the moving elements. Thus, these mechanisms necessitate a means for finely compensating the difference in motion among the moving elements and cannot be used practically.

To overcome this fault found with the conventional diaphragm mechanisms, there has been proposed a practical diaphragm device of small size which assures reliable motion of the diaphragm leaves (Japanese Patent Application Public Disclosure No. SHO 58(1983)-80627). The proposed diaphragm device comprises a pair of arcuate magnets disposed across an iris aperture and a circular moving coil concentrically arranged relative to the magnets and rotatably supported at the both sides thereof by means of pivots, so that the moving coil is rotated around the pivots by supplying to the moving coil an electric current corresponding to the brightness of the subject, thereby to cause a plurality of diaphragm leaves to be simultaneously opened or closed. This diaphragm device has an outstanding advantage that it can effectively open or close the diaphragm leaves, whereas the pivots extending outwardly from the sides of the moving coil prevent miniaturization of the diaphragm device because the pivots somewhat project outward. Furthermore, the privots are integrally formed on pivot fixing seats and fixed to the sides of the moving coil by the medium of the pivot fitting seats by use of adhesives and so on. However, if the portions to which the pivot fixing seats with the pivots are fixedly adhered has large curvature, it is difficult to completely fix the pivot fixing seats to the circular moving coil.

OBJECT OF THE INVENTION

In view of the above, the primary object of the present invention is to provide an iris diaphragm device of a simple structure, capable of being miniaturized without decreasing the opening or closing efficiency of iris diaphragm leaves and preventing an optical system such as a lens barrel into which the device is incorporated from being increased in size or protruding in part.

Another object of the present invention is to provide an iris diaphragm device in which a pair of pivot pins around which a movable magnetic ring is swingingly rotated can be fast attached to the sides of the movable magnetic ring with ease.

SUMMARY OF THE INVENTION

To accomplish the objects described above according to the present invention, there is provided an iris diaphragm device which comprises a plurality of iris diaphragm leaves for forming an iris aperture, pivotally disposed around the iris aperture and each having a cam slot, a leaf operating disc provided with sliding pins slidably admitted into the cam slots in the iris diaphragm leaves and rotatably disposed so as to cause iris diaphragm leaves to be opened or closed, a drive element comprising at least one stationary magnetic member and a movable magnetic ring formed in a noncircular shape and having remote segments opposite to the stationary magnetic member and near segments each having pivot pin extending outwardly from the respective sides thereof, which movable magnetic ring being swingingly rotated around the pivot pins by electomagnetic interaction between the stationary megnetic member and the movable magnetic ring, and a connecting lever for transmitting rotational motion of the movable magnetic ring to the leaf operating disc.

In case that the movable magnetic ring is an electromagnetic coil and the at least one stationary magnetic member is composed of permanent magnets, the movable magnetic ring is excited to be swung around the pivot pins by supplying an electric current corresponding to the quantity of the light passing through the lens system of the camera. When the movable magnetic ring is a permanet magnet and the stationary magnetic member is composed of electromagnetic coils, by supplying an electric current to the stationary magnetic member the movable magnetic ring is swung around the pivot pins. The swinging motion of the movable magnetic ring which is brought about by application of an electric current thereto is transmitted to the leaf operating disc by means of the connecting lever to cause the leaf operating disc to be turned, with the result that the diaphragm leaves effect the opening or closing motion by means of the sliding pins of the leaf operating disc which are admitted into cam slots of the diaphragm leaves, thereby to effectively vary the iris aperture in diameter in accordance with the brightness of the subject.

The outer diameter of the opposed remote segments of the movable magnetic ring is made somewhat smaller than the inner diameter of the lens barrel of the camera into which the diaphragm device is incorporated. Since the distance between the opposed near segments is smaller than that between the opposed remote segments, the pivot pins extending outwardly from the sides of the near segments come no longer into contact with the inner surface of the lens barrel, whereby the diaphragm device can be compactly mounted in the lens system.

The near segments of the movable magnetic ring may assume a straight shape or a slightly curved shape. In other words, the movable magnetic ring may be formed in the shape of an angular or roundish ellipse. Because the pivot pins are integrally formed on pivot fixing seats so as to be attached to the sides of the near segments of a straight or slightly curved shape by the medium of the pivot fixing seats, perfect attachment of the pivot pins to the movable magnetic ring can very easily be accomplished.

BRIEF DESCRIPTION OF THE DRAWINGS

These and other objects of the invention will be more easily understood from the following detailed description made with reference to the accompanying drawings, wherein:

FIG. 1 is a schematic view showing the state in which the iris diaphragm device according to the present invention is incorporated in the lens system of a camera as one example;

FIG. 2 is a perspective view showing in a disassembled menner the iris diaphragm device in one embodiment of this invention;

FIG. 3 is a schematic view for explaining the operating principle of an iris diaphragm leaf mounted in the diaphragm device of this invention;

FIG. 4 is a schematic view for explaining the operating principle of a drive element mounted in the diaphragm device of this invention;

FIG. 5 is an exploded perspective view of the drive element of this invention;

FIG. 6 is a bottom view of the same;

FIG. 7 is a schematic bottom view of a drive element in another embodiment of this invention; and FIG. 8 is a schematic bottom view of a drive element in still another embodiment of this invention.

DESCRIPTION OF THE PREFERRED EMBODIMENTS

This invention relates to an iris diaphragm device which comprises a base member 1, a diaphragm element 10 and a drive element 100 and is incorporated into, for example, a lens system S in a video camera as illustrated in FIG. 1.

The base member 1 comprises a cylidrical body 3 having an aperture 2 with the center through which an optical axis O passes, and a flange portion 4 extending outwardly from the circumferential surface of one end of the cylindrical body 3. The flange portion 4 is provided in its one side surface with an annular groove 5 and an annular step portion 6. In a part of the flange portion 4, a through hole 7 is bored.

The diaphragm element 10 which is fixed on the base member 1 comprises a leaf operating disc 20, a supporting plate 30, a set of iris diaphragm leaves 40, and a cover plate 50.

The leaf operating disc 20 is rotatably set in the annular groove 5 formed in the flange portion 4 of the base member 1 and provided on one surface thereof with sliding pins 21 equal to the iris diaphragm leaves 40 in number and stopper pins 22 and 23, and on the other surface with a connector 24.

The supporting plate 30 has an outer diameter substantially same as that of the annular step portion 6 formed in the flange portion 4 of the base member 1 and arcuate slots 31 through which the sliding pins 21 on the leaf operating disc 20 are slidably inserted so that the sliding pins 21 can move in the circumferential direction by a fixed length. On one side of the supporting plate 30, leaf supporting pins 32 for pivotally supporting the iris diaphragm leaves 40 are distributed substantially at equi-distance about the periphery of the iris aperture. The supporting plate 30 is further provided with a slot 33 and a notch 34 for admitting the corresponding stopper pins 22 and 23 thereinto so as to restrict the rotation of the leaf operating disc 20 within a limited range. These stopper pins 22 and 23, the slot 33 and the notch 34 are not indispensable components of the invention.

That is to say, instead of these components, the restriction of the rotation of the leaf operating disc 20 may be accomplished merely by means of the sliding pins 21 and the arcuate slots 31 which are engaged with each other. Further, if the leaf supporting pins 32 on the supporting plate 30 are provided on the base member 1 and the slots 31 and 33 and the notch 34 are formed in the cover plate 50, the supporting plate 30 can be omitted.

Denoted by 35 are screw fitting holes.

In this embodiment, the iris diaphragm leaves 40 arranged in a circular form are adopted, whereas the shape and number of the iris diaphragm leaves are not specifically limited. For example, two or more leaves may be disposed at equal distances around the aperture and simultaneously, the sliding pins 21 on the leaf operating disc 20 and the arcuate slots 31 and the leaf supporting pins 32 on the supporting plate 30 should be equal to the diaphragm leaves 40 in number. Each of the iris diaphragm leaves 40 has a pivot hole 41 for receiving the corresponding leaf supporting pin 32 fixed on the supporting plate 30 and a cam slot 42 into which the corresponding sliding pin 21 fixed on the leaf operating disc 20 is slidably admitted.

The relationship among the pivot hole 41, the cam slot 42 formed in the iris diaphragm leaf 40 and the leaf operating disc 20 will be explained with reference to FIG. 3. The iris diaphragm leaf 40 is swung around the leaf supporting pin 32 within the range of the angle $\theta$, that is, from the open state in which the iris diaphragm leaf 40 is completely open out to form the entire aperture as illustrated by the full line in FIG. 3 to the close state in which the iris diaphragm leaf 40 is closed to cause the aperture to disappear as illustrated by the chain line in FIG. 3. The required range within which the diaphragm leaf should be swung and the required length L of the cam slot 42 cannot be specified because they depend on the inclination of the cam slot 42 relative to the pivot hole 41, for example. Although the orbit t along which the sliding pins on the leaf operating disc 20 rotatably move is placed outside the pivot holes 41 in the illustrated embodiment, the orbit may nevertheless be located inside the pivot hole 41.

The cover plate 50 is adapted to cover the leaf operating disc 20, the supporting plate 30, and the iris diaphragm leaves 40 which are contained within the annular groove 5 in the base member 1 and is provided with guide recesses 51 for guiding the aforementioned sliding pins 21 and bearing holes 52 for pivotally supporting the leaf supporting pins 32. The cover plate 50 is attached to the base member 1 by use of screw means 54 and so on to be inserted through fitting portions 53.

In this embodiment, the drive element 100 comprises a movable magnetic ring 110 formed in a noncircular shape having its center which is substantially in agreement with the optical axis O and a pair of stationary magnetic members 120 disposed inside the movable magnetic ring 110 and opposed to each other across the aperture. The movable magnetic ring 110 is an electromagnetic coil which is excited by supplying an electric current thereto and the stationary magnetic members 120 are arcuate permanet magnets. In general, the electromagnetic coil for use in the diaphragm device of this type has a double coil structure composed of a coil for generating rotational moment and a damping coil. The functional principle of opening or closing motion of the diaphragm leaves 40 by means of the drive element 100 will be described hereinafter with reference to FIG. 4.

The stationary magnetic members 120 such as arcuate magnets are disposed having the optical axis O as a center and the movable magnetic ring 110 such as an electromagnetic coil is concentrically disposed outside the stationary magnetic members. The movable magnetic ring 110 is pivotally supported by pivot pins 111 extending outwardly in the direction perpendicular to the optical axis O. Though the movable magnetic ring 110 is kept energized by a spring 112 in one direction so as to close the iris diaphragm leaves when the camera is out of use, the spring 112 is not an indispensable component for the diaphragm device of the invention.

The movable ring 110 which is an electromagnetic coil is applied with a fixed bias current while in use. The electric current to be supplied from a power source b to the movable ring 110 is varied in quantity or changed in its polarity to reverse the direction of the magnetization thereof by means of a controller c in accordance with the quantity of the light incident upon an photoelectric element e. This diaphragm device can utilize any of conventional controlling circuits as a controller for controlling the electric current to be applied to the movable magnetic ring. Thus, the movable ring 110 is swingingly moved. The swinging motion of the movable ring 110 is transmitted to the leaf operating disc 20 through the medium of the connecting lever 130 and the connector 24 attached to the leaf operating disc 20, thereby to cause opening or closing motion of the iris diaphragm leaves 40 so as to determine the correct exposure.

Referring to FIG. 5, there is shown the drive element 100 in one embodiment according to this invention in its disassembled state. The yoke 140 adapted to support the movable magnetic ring 110 and the stationary magnetic member 120 comprises a base plate 141 having an aperture, arcuate inner and outer walls 142 and 143 which extend vertically relative to the base plate 141 from the inner and outer edge portions of the base plate 141. The stationary magnetic members 120 are held in position within the space defined between the opposed inner and outer walls 142 and 143 in a state of intimate contact with either the inner walls or the outer walls. The movable magnetic ring 110 is pivotally supported between the respective stationary magnetic members 120 and either the outer walls 143 or the inner walls 142 which are separated from the stationary magnetic members. The movable magnetic ring 110 assumes a noncircular or substantially elliptical shape as shown in FIG. 6. In other words, the movable magnetic ring 110 has remote segments 113 apart from each other in the direction in which the stationary magnetic members are opposite to each other and near segments 114 somewhat close to each other. The near segments 114 in this embodiment are made straight. To the respective center portions of the near segments 114, there are respectively attached pivot fixing seats 115 and 116 each having the pivot pin 111 extending outwardly therefrom. The pivot pins 111 formed integrally on the respective pivot fixing seats are pivotally supported by supporting frames 147 and 148 of the yoke 140 by the medium of bearing members 145 and 146. On the bearing members 145 and 146, there are fixed wiring plates 149 for holding in position lead wires 150 connected to the coil as a movable magnetic ring 110 and external leading wires 151 to bring the corresponding wires into the conductive condition.

One of the pivot fixing seats, 116, is provided with an eccentric pin 117 in addition to the pivot pin 110. The pivot pin 111 and the eccentric pin 117 on the pivot fixing seat 116 are brought into engagement with the connecting lever 130 so that the rotational motion of the movable magnetic ring 110 can be transmitted to the leaf operating disc 20 by means of the connecting lever 130 and the connector 24 which are linked with each other, thereby to rotate the leaf operating disc 20.

Denoted by 160 is a cover which is attached to the yoke 140 by the medium of spacers 161 to define a space left for accommodating the movable magnetic ring 110 and the stationary magnetic members 120.

In accordance with the embodiment having the construction described above, the components for pivotally supporting the movable magnetic ring 110 which includes the pivot fixing seats 116 with the pivot pins 111 and transmitting the swinging motion of the movable magnetic ring 110 to the leaf operating disc 20 can wholly be contained in the space defined between the respective near segments and the inner surface of the lens barrel within which the iris diaphragm device is mounted, thereby to render the lens system effectively usable in its smallest possible diameter, thus making it possible to realize a small diaphragm device capable of determining appropriate exposure in response to the quantity of the light passing through the iris aperture of the lens system.

Though, in the foregoing embodiment, the near segments are formed in a straight shape, they may be of any shape insofar as the distance between the opposed near segments is shorter than that between the opposed remote segments. Therefore, the movable magnetic ring may be composed of the remote segments having larger curvature and the near segments having smaller curvature so as to assume an ellipse as shown in FIG. 7.

In the embodiment of FIG. 7, the movable magnetic ring 110 is formed of a permanent magnet and the stationary magnetic member is composed of an electromagnetic coil of a circular or elliptical shape. In this case, by applying an electric current corresponding to the quantity of the light passing through the iris aperture 2 to the stationary magnetic member (electromagnetic coil) 120, the movable magnetic ring (permanent magnet) 110 can be driven to be swung. Other configurations of the movable magnetic ring can also be used as shown in FIG. 8, for example. The movable magnetic ring 110 of the embodiment shown in FIG. 8 is composed of angularly bent remote segments 313 and straight near segments 313 and straight near segments 314 so as to assume a polygonal shape.

In any event, as described above, the space left between the respective outer sides of the near segments and the inner surface of the lens barrel can accommodate the aforementioned components inclusive of the pivot pins 111 and the connecting lever 130 without the smallest strain. Accordingly, the lens barrel accommodating this diaphragm device need not be increased in diameter or partly swelled.

As is clear from the foregoing description, according to the present invention, the iris diaphragm device wherein the diaphragm leaves are driven to be opened or closed by the rotational motion of the leaf operating disc which is caused by swingingly moving the movable magnetic ring attains high reliability and efficiency in opening or closing motion of the diaphragm leaves. This invention can furthermore materialize miniaturization of the lens system into which the diaphragm device incorporated, because the space enough for accommodating the pivot mechanism of the movable magnetic ring is formed on the outsides of the near segments of the movable magnetic ring. Besides, the pivot mechanism composed of the pivot pin and the pivot fixing seat can be fast attached to each near segment of the movable magnetic ring because the near segment is made substantially straight. Thus, the present invention provides an iris diaphragm device which excels in durability and can maintain its performance intact over a long time.

Obviously, many modifications and variations of the present invention are possible in light of the above teachings. It is therefore to be understood that within the scope of the appended claims, the present invention may be practiced otherwise than as specifically described herein.

What is claimed is:

1. A diaphragm device for a camera comprising a plurality of iris diaphragm leaves for forming an iris aperture having the center through which an optical axis passes, pivotally disposed at equal intervals around said iris aperture and each having a cam slot; a leaf operating disc provided with sliding pins slidably admitted into said cam slots bored in said iris diaphragm leaves and disposed concentrically rotatably relative to said iris aperture so as to permit opening or closing motion of said iris diaphragm leaves; a drive element comprising at least one stationary magnetic member and a movable magnetic ring formed in a noncircular shape having its center substantially in agreement with the optical axis and having remote segments opposite to said stationary magnetic member and near segments each having pivot pin extending outwardly in the direction perpendicular to the optical axis, said movable magnetic ring being swingingly rotated around said pivot pins by electromagnetic interaction between said stationary magnetic member and said movable magnetic ring; and a connecting lever for transmitting rotational motion of said movable magnetic ring to said leaf operating disc.

2. An iris diaphragm device according to claim 1, wherein said movable magnetic ring is composed of an electromagnetic coil and said stationary magnetic member is composed of at least one permanent magnet.

3. An iris diaphragm device according to claim 1, wherein said movable magnetic ring is composed of an electromagnetic coil and said stationary magnetic member is composed of a pair of permanent megnets opposite to each other across the aperture.

4. An iris diaphragm device according to claim 1, wherein said stationary magentic member is composed of an electromagnetic coil and said movable magnetic ring is composed of a permanent magnet disposed outsid said stationary megnetic member.

5. An iris diaphragm device according to claim 1, wherein said near segments of the movable magnetic ring are made straight and said remote segments thereof are made arcuate.

6. An iris diaphragm device according to claim 1, wherein said movable magnetic ring is formed of near segments having small curvature and remote segments having larger curvature.

7. An iris diaphragm device according to claim 1, wherein said movable magnetic ring is formed in a polygonal shape of straight near segments and angularly bent remote segments.

8. An iris diaphragm device according to claim 1, wherein said pivot pins are integrally formed with pivot fixing seats and fixedly attached to the sides of said near segments by the medium of said pivot fixing seats.

9. An iris diaphragm device according to claim 1, further comprising a base member having an aperture and adapted to mount on its one side said leaf operating disc and said iris diaphragm leaves and on the other side thereof said drive element.

10. An iris diaphragm device according to claim 1, further comprising a yoke having an aperture and provided with inner walls and outer walls, which yoke is adapted to rotatably support said movable magnetic ring and hold in position said stationary member between the respective inner and outer walls.

* * * * *